Feb. 2, 1960  J. R. COLLION  2,923,031
DEVICE FOR REMOVING THE SPRUE FROM OBJECTS
PRODUCED BY INJECTION MOLDING OPERATIONS
Filed March 4, 1958
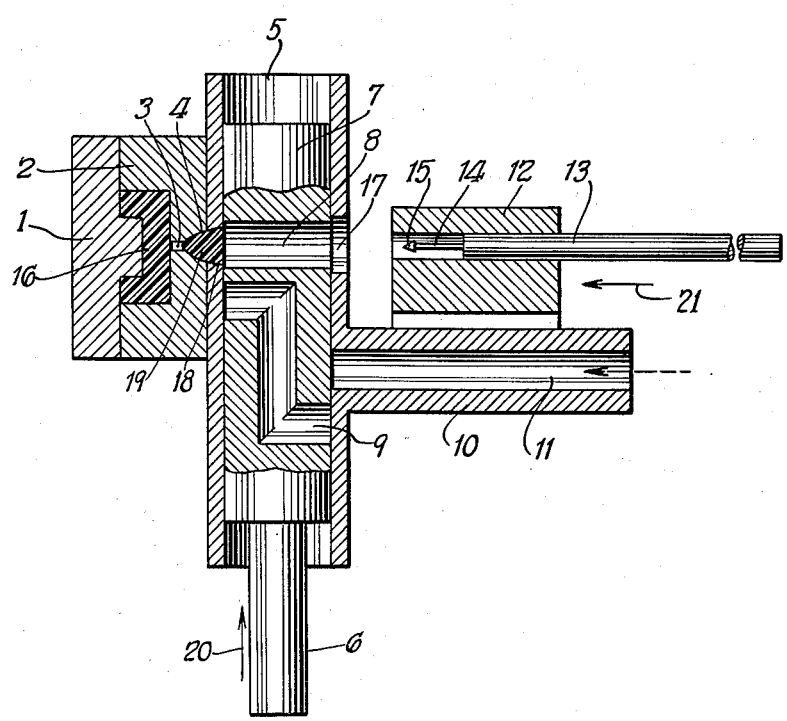
INVENTOR.
JOSEPH RAYMOND COLLION.
BY
ATTORNEY.

United States Patent Office 2,923,031
Patented Feb. 2, 1960

2,923,031

DEVICE FOR REMOVING THE SPRUE FROM OBJECTS PRODUCED BY INJECTION MOLDING OPERATIONS

Joseph Raymond Collion, Lyon, France, assignor to A. Nothelfer & Sohne, Ravensburg, Germany, a firm of Germany Application March 4, 1958, Serial No. 719,114

6 Claims. (Cl. 18—30)

In injection molding machines of various types, a sprue is normally formed as a part of the molding operation, and this sprue must then be removed. Various devices have been proposed which form part of the mold and which automatically remove the sprue at the completion of the molding cycle. These devices must, of course, be specially designed for each mold. In many instances, the use of a specially designed attachment for removing the sprue is not practical because of space considerations and the removal of the sprue formed must be carried out in an entirely separate operation.

It is, therefore, an important object of this invention to provide means adapted to be employed in injection molding operations for the removal of the sprue formed and which may be employed satisfactorily regardless of the shape of the mold.

Another object of this invention is the provision of means for removing the sprue formed during injection molding operations which is of simple construction and which may be readily integrated into the molding cycle and which in addition is suitable for use where a plurality of molds mounted on a rotating turret head are employed.

Other objects of this invention will appear from the following detailed description.

In the drawing, the figure is a view in section of the improved apparatus of this invention.

Referring now to the drawing, the mold with which the injection molding operation is carried out is a split mold and consists of two halves, a front section 1 and a rear section 2 which are held firmly together in closed position during the molding operation by suitable pressure means. The rear mold section 2 is provided with a gate 3 through which the thermoplastic material being molded flows into the mold, said thermoplastic material entering gate 3 through a tapered opening 4 which communicates with the cylinder 5. Cylinder 5 is in a fixed or stationary position during the molding operation but contains a reciprocable piston 7 which is mounted on a shaft 6, said piston 7 being provided with a lateral passage 8 and a Z-shaped passage 9.

Integral with cylinder 5 is a right-angularly projecting cylinder 10 provided with an internal passage 11 normally containing molten thermoplastic material. Cylinder 5 also contains openings 17 and 18 which are oppositely disposed to each other with opening 18 being in register with tapered opening 4 as described above. Adjacent to cylinder 5 and having the same axis as opening 17, 18 is mounted a cylinder 12 containing a reciprocating shaft member 13 having mounted at one end a pin 14 carrying a conically shaped point 15 which is adapted to act as a barb. The diameter of the conically shaped point 15 is somewhat smaller than the diameter of the gate 3 through which the thermoplastic material flows into the mold. During the molding operation the thermoplastic material passes into the mold formed by mold halves 1 and 2 forming a molded object 16 to which is attached a sprue 19. This operation is effected by the action of piston 7. By suitably synchronizing the action of pistons 7 and 13, as will be hereinafter described, the removal of the sprue 19 may be readily effected.

The molding cycle is carried out in the following manner. Piston 7 is moved upwardly by the application of a suitable force on shaft 6 in the direction of the arrow 20 and this action causes the Z-shaped passage 9 to be brought into register with passage 11 and passage 18 respectively. In this position opening 17 is closed off by the wall of piston 7. The thermoplastic material in passage 11 is now able to flow into the cavity of the mold through passage 9 and gate 3, the thermoplastic material entering gate 3 by way of opening 18. When the mold cavity has filled, the downward stroke of the piston 7 is then effected which brings it to the position shown in the figure, thus cutting off the flow of thermoplastic material from passages 9 and 11. The first part of the molding cycle is thus completed with the molded object 16 being held in the closed mold cavity and with the sprue 19 being attached to it by the small residue of thermoplastic material in gate 3.

The reciprocating motion of the piston 7 is, however, synchronized with the action of piston 13 and, when the downward stroke of shaft 6 is completed, the piston 13 is then moved to the left in the direction shown by the arrow 21. The stroke of piston 13 is such that the conically shaped point 15 passes completely through the still soft sprue 19, the point 15 travelling sufficiently far to enter passage 3. This action takes place through the clear opening thus provided by passage 8 and by opening 17 when the downward stroke of piston 6 is completed. After the pointed end of conically shaped point 15 passes into gate 3 and touches the molded object 16, a short time interval is provided during which the soft thermoplastic material is permitted to harden slightly.

On the reverse stroke of piston 13, the pin 14 is drawn to the retracted position within cylinder 12. Since the conical head 15 is embedded in the slightly hardened thermoplastic material comprising sprue 19, this reverse stroke serves to separate the sprue from the molded object 16. As the reverse stroke continues and pin 14 is drawn to the retracted position, the sprue 19 is carried backward on pin 14 and the reverse movement of the pin 14 causes sprue 19 to strike the edge of the cylinder 12 and to be thereby removed. Spruce 19 then falls away, thereby clearing pin 14 for the next molding cycle. At a suitable point in the cycle, the mold halves 1 and 2 are opened and the molded object 16 is discharged therefrom. The molding cycle is then repeated by the upward movement of piston 7 which permits the mold cavity to be refilled and a second molded object to be formed with a sprue 19 attached to it.

The apparatus described can also be employed in injection molding operations where a plurality of mold halves 1 and 2 are mounted on a turret head for rotary motion. At least two stations can thus be provided, at one of which the molding operation takes place and at the other the sprue formed is removed. Any number of stations can be provided and in such an arrangement the cylinder 5 and piston 7 may be omitted, when other provisions are made for the introduction of the thermoplastic material into each mold as it reaches a molding station in the molding cycle. The incorporation of piston 7 in the system is a preferred form of this invention.

What is claimed is:

1. In a molding apparatus comprising a mold and a gate leading to the cavity of said mold in which a sprue is normally formed during molding operations and which is exposed at the completion of the molding operation, the combination of a pin, a shaft carrying said pin and means for reciprocating said shaft along an axis coaxial with said gate, whereby said pin is caused to enter said gate and is embedded in said sprue on forward movement and is withdrawn from said gate with said sprue on the reverse stroke.

2. In molding apparatus in accordance with claim 1, wherein said pin is provided with a head whose diameter is smaller than that of the gate.

3. In molding apparatus in accordance with claim 1, wherein said pin is provided with a conical head comprising a barb whose diameter is smaller than that of the gate.

4. In molding apparatus in accordance with claim 1, wherein a plurality of molds are employed which register from station to station with said pin.

5. In molding apparatus comprising a mold and a gate leading to the cavity of said mold in which a sprue is normally formed during molding operations, the combination of slide valve means comprising a reciprocating piston provided with a first passage and a second passage, said first passage registering with said gate during a molding operation wherein the mold cavity is filled, and said second passage registering with said gate and the sprue formed therein after said molding operation, and reciprocating means coaxial with said second passage adapted to be embedded in said sprue and remove it through said second passage.

6. In molding apparatus in accordance with claim 5, wherein said coaxial reciprocating means comprises a pin and a shaft carrying said pin, said pin having a conical head thereon.

References Cited in the file of this patent

UNITED STATES PATENTS 2,436,122  Rotsler _____ Feb. 17, 1948

FOREIGN PATENTS 900,748  Germany _____ Jan. 4, 1954